(12) United States Patent
Watanabe et al.

(10) Patent No.: US 9,740,890 B2
(45) Date of Patent: Aug. 22, 2017

(54) CARD INSERTION PART AND CARD READER

(71) Applicant: NIDEC SANKYO CORPORATION, Suwa-gun, Nagano (JP)

(72) Inventors: Takeki Watanabe, Nagano (JP); Fumiya Akasu, Nagano (JP); Yuji Fujimori, Nagano (JP); Akiyoshi Saito, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/317,504

(22) PCT Filed: May 11, 2015

(86) PCT No.: PCT/JP2015/063423
§ 371 (c)(1),
(2) Date: Dec. 9, 2016

(87) PCT Pub. No.: WO2015/190199
PCT Pub. Date: Dec. 17, 2015

(65) Prior Publication Data
US 2017/0132437 A1     May 11, 2017

(30) Foreign Application Priority Data
Jun. 10, 2014 (JP) .................... 2014-119657

(51) Int. Cl.
*G06K 7/00* (2006.01)

(52) U.S. Cl.
CPC ......... *G06K 7/0013* (2013.01); *G06K 7/0056* (2013.01)

(58) Field of Classification Search
USPC ................. 235/379, 380, 454, 486
See application file for complete search history.

(56) References Cited

U.S. PATENT DOCUMENTS

| | | | |
|---|---|---|---|
| 2006/0137959 A1* | 6/2006 | Iida .................. | G07D 7/04 194/207 |
| 2011/0253916 A1* | 10/2011 | Murosaki ............ | B65H 7/04 250/559.07 |
| 2015/0287289 A1* | 10/2015 | Lewis ............... | G07F 19/201 235/379 |

FOREIGN PATENT DOCUMENTS

| DE | 3528558 A1 * | 2/1987 | ............ G06K 13/08 |
|---|---|---|---|
| JP | 2004185513 A | 7/2004 | |
| JP | 2007141023 A | 6/2007 | |

(Continued)

OTHER PUBLICATIONS

International Search Report corresponding to Application No. PCT/JP2015/063423; Date of Mailing: Jun. 23, 2015, with English translation.

*Primary Examiner* — Daniel Hess
(74) *Attorney, Agent, or Firm* — Cantor Colburn LLP (57) ABSTRACT

A card insertion part for use with a card may include a card insertion port; a light guide member surrounding at least a part of a periphery of the card insertion port when viewed in an inserting direction of the card; a light source configured to emit a light toward the light guide member; a reflection member disposed on a rear side with respect to the light guide member in the inserting direction of the card; and a cover member including the card insertion port and covers at least the light guide member and the light source from a front side in the inserting direction of the card. The cover member may include translucent light transmissive material.

25 Claims, 5 Drawing Sheets

(56) References Cited

FOREIGN PATENT DOCUMENTS

| | | | |
|---|---|---|---|
| JP | 2011180628 | A | 9/2011 |
| JP | 2013020350 | A | 1/2013 |
| WO | 0242990 | A1 | 5/2002 |

* cited by examiner

CARD INSERTION PART AND CARD READER

CROSS REFERENCE TO RELATED APPLICATIONS

This is the U.S. national stage of application No. PCT/JP2015/063423, filed on May 11, 2015. Priority under 35 U.S.C. §119(a) and 35 U.S.C. §365(b) is claimed from Japanese Application No. 2014-119657, filed Jun. 10, 2014, the disclosure of which is incorporated herein by reference.

TECHNICAL FIELD

At least an embodiment of the present invention relates to a card insertion part for a card reader formed with a card insertion port into which a card is inserted, and to a card reader provided with the card insertion part.

BACKGROUND

Conventionally, a card gate mechanism (card insertion part) structuring a part of a card reader has been known (see, for example, Patent Literature 1). The card insertion part described in Patent Literature 1 includes a light source part, a light guide member which guides a light emitted from the light source part, and a gate frame formed with a gate port (card insertion port) into which card is to be inserted. The gate frame is formed in a hollow shape and the light source part and the light guide member are disposed inside the gate frame. Further, the gate frame is formed of transparent material which transmits light. Therefore, in the card insertion part, when a light is emitted from the light source part toward the light guide member, the gate frame formed with the card insertion port is illuminated. In other words, when a light is emitted from the light source part toward the light guide member in the card insertion part, a peripheral portion of the card insertion port is illuminated.

PATENT LITERATURE

[PTL 1] International Publication WO 2002/042990

Some card readers are mounted and used in a game machine or the like installed in a casino or a game center. In recent years, in a market of a card reader used in a game machine or the like, the need for the card reader having a highly decorative card insertion part in which the entire peripheral portion of a card insertion port is capable of being illuminated uniformly, dully and beautifully has been increased.

SUMMARY

In view of the problem described above, at least an embodiment of the present invention is to provide a card insertion part in which the entire peripheral portion of a card insertion port is capable of being illuminated uniformly, dully and beautifully. Further, at least an embodiment of the present invention is to provide a card reader comprising the card insertion part.

In view of the above, at least an embodiment of the present invention provides a card insertion part for a card reader which is formed with a card insertion port into which a card is to be inserted including a light guide member which surrounds at least a part of a periphery of the card insertion port when viewed in an inserting direction of the card, a light source configured to emit a light toward the light guide member, a reflection member which is disposed on a rear side with respect to the light guide member in the inserting direction of the card, and a cover member which is formed with the card insertion port and covers at least the light guide member and the light source from a front side in the inserting direction of the card. The cover member is formed of translucent light transmissive material.

In the card insertion part in accordance with at least an embodiment of the present invention, a light guide member surrounds at least a part of a periphery of the card insertion port when viewed in an inserting direction of the card, and a reflection member is disposed on a rear side with respect to the light guide member in the inserting direction of card. Further, in at least an embodiment of the present invention, the cover member covers the light guide member and the light source from a front side in the inserting direction of the card. Therefore, according to at least an embodiment of the present invention, a light from the light source can be diffused over the entire peripheral portion of the card insertion port on a rear side at least a part of the cover member by operation of the light guide member and the reflection member. Further, in at least an embodiment of the present invention, the cover member which covers the light guide member and the light source from a front side in the inserting direction of a card is formed of translucent light transmissive material. Therefore, light transmitting through the cover member toward the front side in the inserting direction of a card can be made dull. As described above, in at least an embodiment of the present invention, light can be diffused over the entire peripheral portion of the card insertion port on a rear side with respect to at least a part of the cover member in the inserting direction of a card, and the light diffused over the entire peripheral portion of the card insertion port on the rear side of the cover member can be made dull by the cover member. Therefore, according to at least an embodiment of the present invention, the entire peripheral portion of the card insertion port is capable of being illuminated uniformly (in other words, without a spot), dully and beautifully.

In at least an embodiment of the present invention, it is preferable that the cover member is formed of the light transmissive material having a milk-white color. According to this structure, the entire peripheral portion of the card insertion port can be further beautifully illuminated with various colors.

In at least an embodiment of the present invention, it is preferable that the reflection member is a rigid circuit board on which the light source is mounted. According to this structure, in comparison with a case that a reflection member is provided in addition to the rigid circuit board on which the light source is mounted, a structure of the card insertion part can be simplified.

In at least an embodiment of the present invention, it is preferable that the light guide member is formed in a flat plate shape and is disposed so as to contact with a surface of the rigid circuit board, and the light source is disposed so as to emit a light toward an end face of the light guide member. According to this structure, the size of the card insertion part can be reduced in the inserting direction of a card.

In at least an embodiment of the present invention, it is preferable that the card insertion part includes, as the light source, a first light source and a second light source, the light guide member is formed in a flat plate shape so as to surround the entire periphery of the card insertion port when viewed in the inserting direction of the card, the first light source is disposed so as to emit a light to one side in a width direction of the card perpendicular to the inserting direction of the card and a thickness direction of the card from one end of the light guide member in the width direction of the card toward the other end side of the light guide member, and the second light source is disposed so as to emit a light to the other side in the width direction of the card from the other end of the light guide member in the width direction of the card toward the one end side of the light guide member. According to this structure, the light can be diffused effectively over the entire peripheral portion of the card insertion port. Therefore, the entire peripheral portion of the card insertion port can be illuminated further uniformly.

In at least an embodiment of the present invention, it is preferable that the card insertion part includes, as the light source, a third light source and a fourth light source in addition to the first light source and the second light source, the light guide member is formed in a substantially rectangular frame shape. In addition, on one side of the light guide member in the width direction of the card, the first light source is disposed on one side in the thickness direction of the card and the third light source is disposed on the other side in the thickness direction of the card and is disposed so that a light is emitted in an inclined direction with respect to the width direction of the card and the thickness direction of the card so as to go substantially toward the card insertion port when viewed in the inserting direction of the card. Further, on the other side of the light guide member in the width direction of the card, the second light source is disposed on the other side in the thickness direction of the card and the fourth light source is disposed on the one side in the thickness direction of the card and is disposed so that a light is emitted in an inclined direction with respect to the width direction of the card and the thickness direction of the card so as to go substantially toward the card insertion port when viewed in the inserting direction of the card. According to this structure, the light can be diffused further effectively over the entire peripheral portion of the card insertion port. Therefore, the entire peripheral portion of the card insertion port can be illuminated further uniformly. Further, according to this structure, the third light source and the fourth light source are disposed so as to emit lights in inclined directions with respect to a width direction of a card and a thickness direction of the card when viewed in an inserting direction of the card. Therefore, when the third light source and the fourth light source are disposed so as to contact with the light guide member, the size of the card insertion part can be reduced in the thickness direction of a card.

In at least an embodiment of the present invention, it may be structured that the card insertion part includes, as the light source, a third light source and a fourth light source in addition to the first light source and the second light source, the light guide member is formed in a substantially rectangular frame shape. In addition, on one side of the light guide member in the width direction of the card, the first light source is disposed on one side in the thickness direction of the card, and the third light source is disposed on the other side in the thickness direction of the card and is disposed so that a light is emitted to the one side in the thickness direction of the card toward a side of one end of the light guide member in the thickness direction of the card from the other end of the light guide member. Further, on the other side of the light guide member in the width direction of the card, the second light source is disposed on the other side in the thickness direction of the card, and the fourth light source is disposed on the one side in the thickness direction of the card and is disposed so that a light is emitted to the other side in the thickness direction of the card from the one end of the light guide member toward a side of the other end of the light guide member in the thickness direction of the card. Also in this case, the light can be diffused further effectively over the entire peripheral portion of the card insertion port. Therefore, the entire peripheral portion of the card insertion port can be illuminated further uniformly.

In at least an embodiment of the present invention, for example, a cut-out part is formed so as to cut out from a front end of the card insertion part in an inserting direction of the card toward a rear side in the card inserting direction at an intermediate position of the card insertion part in a width direction of the card perpendicular to an inserting direction of the card and a thickness direction of the card. Further, a guide part formed with a part of a card passage where the card is passed and the light guide member disposed at least on a front side in the inserting direction of the card with respect to the guide part are disposed on both sides of the cut-out part in the width direction of the card, and the cover member covers the guide part and the light guide member. In this case, even when the cut-out part is formed at an intermediate position of the card insertion part in a width direction of the card, the entire peripheral portion of the card insertion port can be illuminated uniformly, dully and beautifully.

In at least an embodiment of the present invention, it is preferable that the light source is disposed so that a light is emitted toward the light guide member from a rear side of the light guide member in an inserting direction of the card, and the reflection member is formed in a plate shape or a film shape and is stuck on a portion of a rear side face of the light guide member in the inserting direction of the card except at least an emitted part where the light from the light source is emitted. According to this structure, the light source is disposed so that a light is emitted toward the light guide member from a rear side of the light guide member in an inserting direction of the card and thus the size of the card insertion part can be reduced in a width direction of the card. Further, according to this structure, the reflection member stuck on the rear side face of the light guide member is formed in a thin plate shape or a film shape and thus the size of the card insertion part can be reduced in an inserting direction of a card.

In at least an embodiment of the present invention, it is preferable that the cover member is provided with cover parts which are disposed on both sides of the cut-out part in the width direction of the card and cover the guide parts from inner sides in the width direction of the card, and a space is formed between the cover part and the guide part in the width direction of the card. According to this structure, both sides of the cut-out part in the width direction of the card can be illuminated dully by utilizing the space formed between the cover part and the guide part.

Further, in this case, the light guide member is provided with a first light guide part which is disposed on a front side of the guide part in the inserting direction of the card, and a second light guide part which is connected with an inner side end of the first light guide part in the width direction of the card and is disposed in the space between the cover part and the guide part. According to this structure, the light can be diffused in the entire space between the cover part and the guide part by operation of the second light guide part. Therefore, the whole on both sides of the cut-out part can be illuminated dully and beautifully.

In at least an embodiment of the present invention, it is preferable that the card insertion part includes a light diffusion member which is disposed between the light guide member and the cover member in the inserting direction of the card. According to this structure, the light can be diffused effectively over the entire peripheral portion of the card insertion port. Therefore, the entire peripheral portion of the card insertion port can be illuminated further uniformly.

The card insertion part in accordance with at least an embodiment of the present invention may be used in a card reader including a main body part to which the card insertion part is fixed. In the card reader, the entire peripheral portion of the card insertion port can be illuminated uniformly, dully and beautifully.

As described above, in at least an embodiment of the present invention, the entire peripheral portion of the card insertion port can be illuminated uniformly, dully and beautifully.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2(A) and 2(B) are explanatory views showing a structure of a card insertion part shown in FIG. 1.

FIGS. 5(A) and 5(B) are explanatory views showing a structure of a card insertion part in accordance with another embodiment of the present invention.

DETAILED DESCRIPTION

Embodiments of the present invention will be described below with reference to the accompanying drawings.
(Entire Structure of Card Reader)

Figure 1:
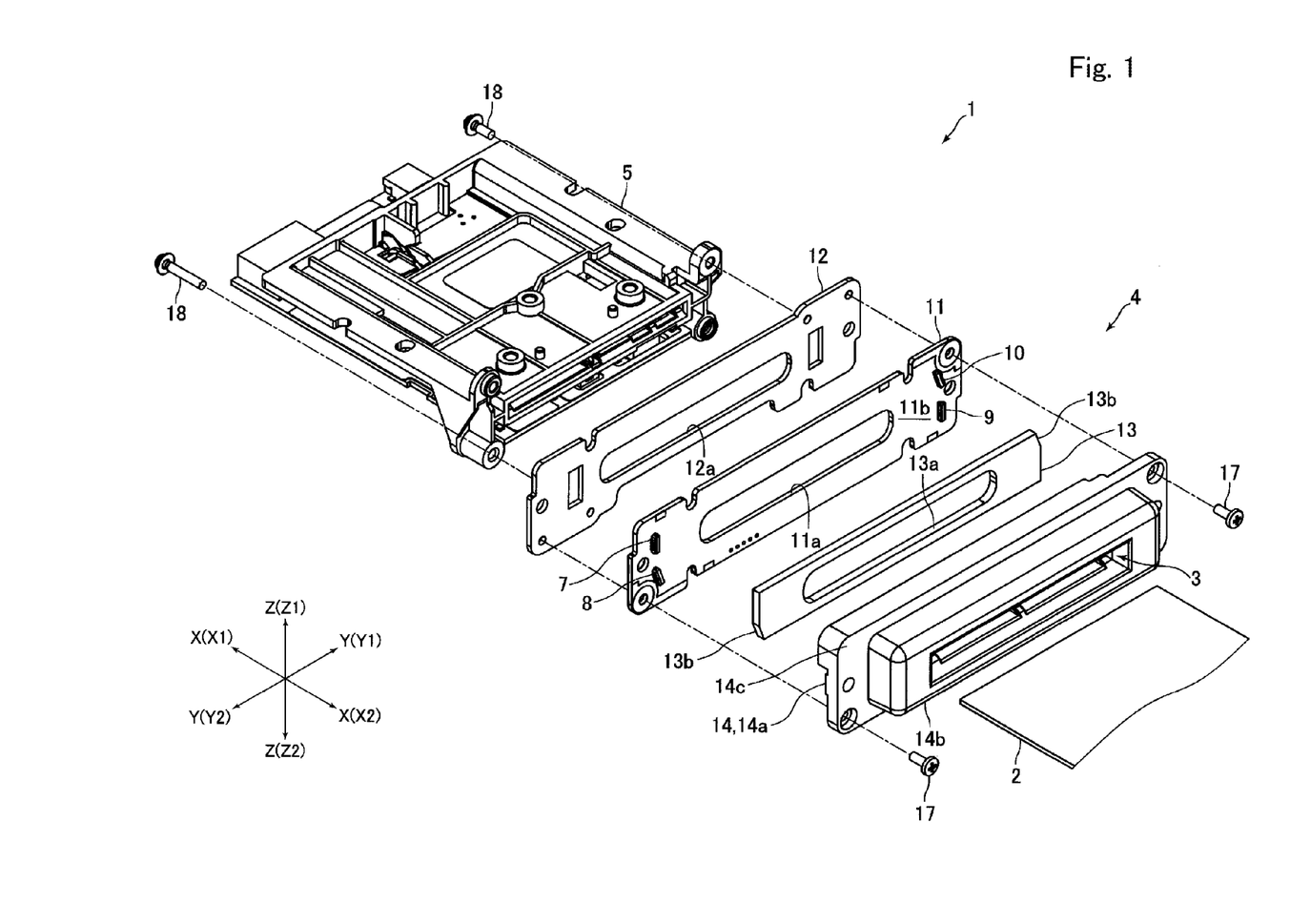
FIG. 1 is an exploded perspective view showing a card reader in accordance with an embodiment of the present invention.

FIG. 1 is an exploded perspective view showing a card reader 1 in accordance with an embodiment of the present invention.

A card reader 1 in this embodiment is a device structured to perform reading of data recorded in a card 2 and/or recording of data to a card 2 and, for example, is mounted and used in a game machine installed in a casino, a game center (game arcade) or the like. Further, the card reader 1 in this embodiment is a manual type card reader in which a card 2 is manually inserted into the card reader 1 and pulled out from the card reader 1 by a user. In other words, the card reader 1 in this embodiment is a so-called dip-type card reader. The card reader 1 includes a card insertion part 4 formed with a card insertion port 3 into which a card 2 is inserted and a main body part 5 to which the card insertion part 4 is fixed. A card passage where a card 2 inserted into the card insertion port 3 is passed is formed inside the card reader 1.

In this embodiment, a card 2 is passed in an "X" direction shown in FIG. 1. Specifically, a card 2 is inserted in an "X1" direction and the card 2 is pulled out in an "X2" direction.

In other words, the "X1" direction is an inserting direction of a card 2, and the "X2" direction is a pulling-out direction of the card 2. Further, a "Z" direction in FIG. 1 perpendicular to the "X" direction is a thickness direction of a card 2 taken into the card reader 1, and a "Y" direction in FIG. 1 perpendicular to the "X" direction and the "Z" direction is a width direction of a card 2 taken into the card reader 1. In the following descriptions, the "X" direction is referred to as a "front and rear direction", the "Y" direction is referred to as a "right and left direction", and the "Z" direction is referred to as an "upper and lower direction". Further, the "X1" direction side is referred to as a "rear (back)" side, the "X2" direction side is referred to as a "front" side, the "Y1" direction side is as a "right" side, the "Y2" direction side is as a "left" side, the "Z1" direction side is as an "upper" side, and the "Z2" direction side is as a "lower" side. In this embodiment, the "X1" direction side is a rear side in an inserting direction of a card 2, and the "X2" direction side is a front side in the inserting direction of a card 2.

A card 2 is, for example, a substantially rectangular-shaped card made of vinyl chloride whose thickness is about 0.7-0.8 mm. A rear face of a card 2 is formed with a magnetic stripe in which magnetic data are recorded. Further, an IC chip is incorporated into a card 2, and a front face of the card 2 is formed with an external connection terminal of the IC chip. A card 2 may be formed with only one of a magnetic stripe or an external connection terminal. Further, a card 2 may be a PET (polyethylene terephthalate) card whose thickness is about 0.18-0.36 mm or may be a paper card having a predetermined thickness.

The main body part 5 includes a magnetic head (not shown) configured to perform reading of magnetic data recorded on a card 2 and/or recording of magnetic data to a card 2, an IC contact block configured to contact with an external connection terminal of an IC chip of the card 2 to perform data communication with the card 2, and the like. The card insertion part 4 is attached to a front end face of the main body part 5. Next, a structure of the card insertion part 4 will be described below.
(Structure of Card Insertion Part)

Figure 2A:
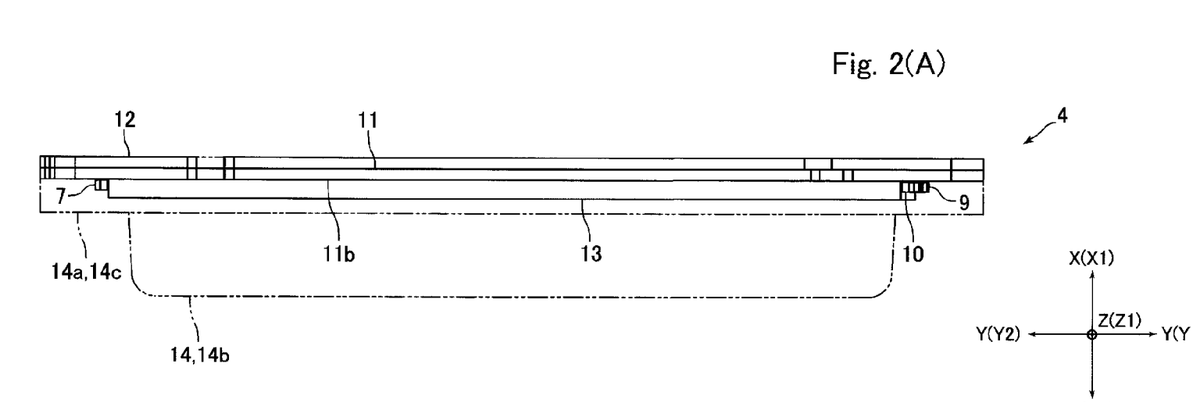
FIG. 2(A) is its plan view and FIG. 2(B) is its front view.
Figure 2B:
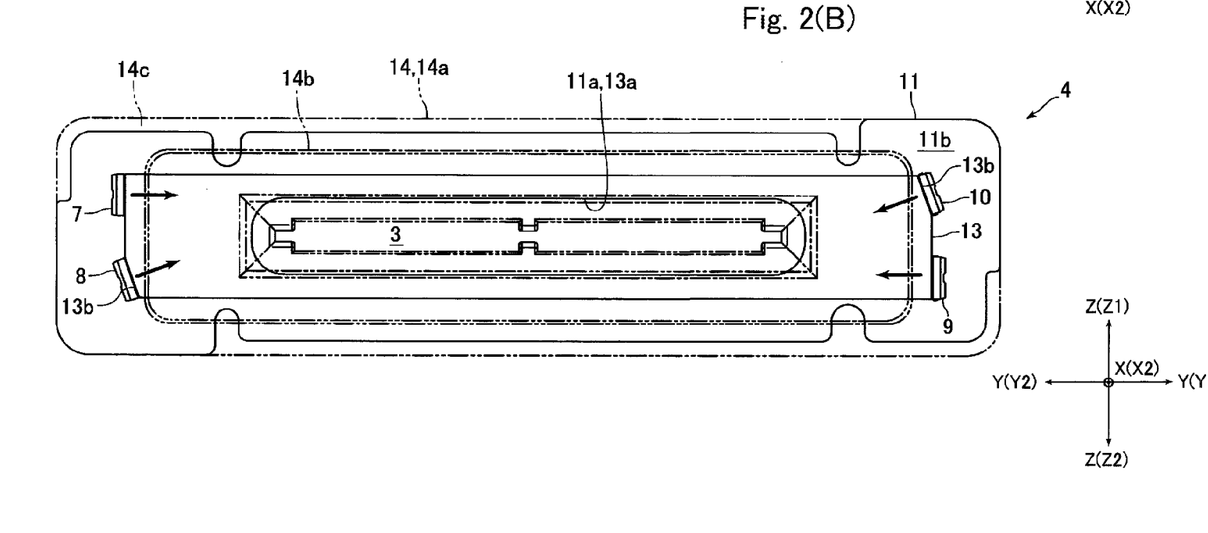

FIGS. 2(A) and 2(B) are explanatory views showing a structure of a card insertion part 4 shown in FIG. 1. FIG. 2(A) is its plan view and FIG. 2(B) is its front view.

A card insertion part 4 includes four light sources 7 through 10, a rigid circuit board 11 on which four light sources 7 through 10 are mounted, and a reinforcing plate 12 to which the rigid circuit board 11 is fixed. Further, the card insertion part 4 includes a light guide member (light guide plate) 13 which is formed in a flat plate shape and a cover member 14 in which a card insertion port 3 is formed.

The light guide member 13 is formed in a substantially rectangular flat plate shape whose long side direction is the right and left direction, and the light guide member 13 is disposed so that a thickness direction of the light guide member 13 and the front and rear direction are coincided with each other. A passage opening 13a where a card 2 is passed is formed at a center of the light guide member 13 so as to penetrate in the front and rear direction. The passage opening 13a is formed in an elongated circular shape whose longitudinal direction is the right and left direction. In other words, the light guide member 13 is formed in a substantially rectangular frame shape and, as shown in FIG. 2(B), when viewed in the front and rear direction, the light guide member 13 is formed so as to surround the entire surrounding area (in other words, the entire periphery) of the card insertion port 3. Further, a chamfer part 13b is formed at a corner part on a right upper end and at a corner part on a left lower end of the light guide member 13 as shown in FIG. 2(B).

The rigid circuit board 11 is formed in a substantially rectangular flat plate shape whose long side direction is the right and left direction and is disposed so that a thickness direction of the rigid circuit board 11 and the front and rear direction are coincided with each other. A width in the right and left direction of the rigid circuit board 11 is set to be wider than a width in the right and left direction of the light guide member 13. Further, a width in the upper and lower direction of the rigid circuit board 11 is set to be wider than a width in the upper and lower direction of the light guide member 13. A center of the rigid circuit board 11 is formed with a passage opening 11a where a card 2 is passed so as to penetrate in the front and rear direction. The passage opening 11a is formed in an elongated circular shape whose longitudinal direction is the right and left direction.

The light sources 7 through 10 are LEDs (Light Emitting Diode) and are mounted on a front face 11b of the rigid circuit board 11. In other words, the front face 11b of the rigid circuit board 11 is a mounting face of the light sources 7 through 10. A drive control circuit for the light sources 7 through 10 is mounted on the rigid circuit board 11. Further, the light guide member 13 is disposed so as to contact with the front face 11b of the rigid circuit board 11. The light sources 7 and 8 are disposed on a left end side of the light guide member 13 and the light sources 9 and 10 are disposed on a right end side of the light guide member 13. In other words, the light sources 7 through 10 are disposed on both end sides of the light guide member 13 in the right and left direction. Further, the light sources 7 through 10 are disposed so as to emit lights toward the light guide member 13. In this embodiment, the light sources 7 through 10 are disposed at the same position as the light guide member 13 in the front and rear direction and emit lights toward end faces of the light guide member 13.

More specifically, the light source 7 is disposed so that a light emission face of the light source 7 faces an upper end side of a left end face of the light guide member 13. In other words, the light source 7 is disposed on an upper end side of the light guide member 13 and is disposed so as to emit a light in the right direction from a left end of the light guide member 13 toward a right end side of the light guide member 13. The light source 8 is disposed so that a light emission face of the light source 8 faces the chamfer part 13b formed at a corner part of a left lower end of the light guide member 13. In other words, the light source 8 is disposed on a lower end side of the light guide member 13. Further, the light source 8 is disposed so as to emit a light from a left end side of the light guide member 13 toward an obliquely right upper direction. In other words, the light source 8 is disposed so as to emit a light in an inclined direction with respect to the right and left direction and the upper and lower direction when viewed in the front and rear direction and in a direction substantially toward the card insertion port 3.

The light source 9 is disposed so that a light emission face of the light source 9 faces a lower end side of a right end face of the light guide member 13. In other words, the light source 9 is disposed on a lower end side of the light guide member 13 and is disposed so as to emit a light in the left direction from a right end of the light guide member 13 toward a left end side of the light guide member 13. The light source 10 is disposed so that a light emission face of the light source 10 faces the chamfer part 13b formed at a corner part of a right upper end of the light guide member 13. In other words, the light source 10 is disposed on an upper end side of the light guide member 13. Further, the light source 10 is disposed so as to emit a light from a right end side of the light guide member 13 toward an obliquely left lower direction. In other words, the light source 10 is disposed so as to emit a light in an inclined direction with respect to the right and left direction and the upper and lower direction when viewed in the front and rear direction and in a direction substantially toward the card insertion port 3.

The light sources 7 through 10 are disposed so as to contact with end faces of the light guide member 13. The light source 7 in this embodiment is a first light source, and the light source 9 is a second light source. Further, the light source 8 is a third light source, and the light source 10 is a fourth light source.

As described above, the light guide member 13 is disposed so as to contact with the front face 11b of the rigid circuit board 11. A color of the front face 11b of the rigid circuit board 11 is set to be white and the front face 11b is formed as a reflection face configured to reflect light emitted toward a rear side from the light guide member 13 to the front side. The rigid circuit board 11 in this embodiment is a reflection member which is disposed on a rear side of the light guide member 13. In accordance with an embodiment of the present invention, when the front face 11b is formed as a reflection face configured to reflect light, a color of the front face 11b may be a color other than white. For example, a color of the front face 11b may be silver.

The reinforcing plate 12 is formed in a flat plate shape which is substantially the same shape as the rigid circuit board 11 and is disposed so that a thickness direction of the reinforcing plate 12 and the front and rear direction are coincided with each other. A center of the reinforcing plate 12 is formed with a passage opening 12a where a card 2 is passed so as to penetrate in the front and rear direction. The rigid circuit board 11 is fixed to the reinforcing plate 12 by screws 17 so as to contact with a front face of the reinforcing plate 12. Further, the reinforcing plate 12 is fixed to the main body part 5 by screws 18. In FIG. 2(B), the reinforcing plate 12 is not shown.

The cover member 14 is formed of resin material. Further, the cover member 14 is formed of translucent light transmissive material. Specifically, the cover member 14 is formed of light transmissive material having a milk-white color. The cover member 14 is structured of a base part 14a formed in a flat plate shape and a substantially rectangular frame shape and a projecting part 14b which is protruded toward a front side from the base part 14a. The projecting part 14b is formed in a substantially rectangular tube shape whose axial direction is the front and rear direction and which is long and thin in the right and left direction. An inner peripheral side of the projecting part 14b is formed as the card insertion port 3. Further, the projecting part 14b is protruded from a center of the base part 14a toward the front side and a front face 14c of the base part 14a is formed in a substantially rectangular frame shape surrounding the entire periphery of the projecting part 14b. In accordance with an embodiment of the present invention, the cover member 14 may be formed of translucent light transmissive material having a color such as gray other than milk-white.

The cover member 14 is fixed to the reinforcing plate 12 together with the rigid circuit board 11 by the screws 17. Further, the cover member 14 covers the light sources 7 through 10, the rigid circuit board 11 and the light guide member 13 from the front side. Specifically, the cover member 14 covers the whole of the light sources 7 through 10, the rigid circuit board 11 and the light guide member 13 from the front side. In this embodiment, the front face 14c of the base part 14a is used as an attaching face to a game machine on which the card reader 1 is mounted. In a state that the card reader 1 has been attached to a game machine, only the projecting part 14b is exposed from a front panel of the game machine. Further, in a state that the card reader 1 has been attached to a game machine, the front face 14c of the base part 14a is covered by a light shielding member.

In this embodiment, a width of the projecting part 14b in the right and left direction is narrower than a width of the light guide member 13 in the right and left direction. Further, as described above, the light source 7 is disposed so that the light emission face of the light source 7 faces an upper end side of the left end face of the light guide member 13, and the light source 8 is disposed so that the light emission face of the light source 8 faces the chamfer part 13b formed at a corner part of a left lower end of the light guide member 13. Further, the light source 9 is disposed so that the light emission face of the light source 9 faces a lower end side of the right end face of the light guide member 13, and the light source 10 is disposed so that the light emission face of the light source 10 faces the chamfer part 13b formed at a corner part of the right upper end of the light guide member 13. Therefore, in this embodiment, the light sources 7 through 10 are disposed on outer sides in the right and left direction with respect to the projecting part 14b. In other words, in this embodiment, when viewed in the front and rear direction, the light sources 7 through 10 are disposed at positions where they do not overlap with an exposed portion (in other words, the projecting part 14b) of the card insertion part 4 in the front panel of a game machine. A width of the projecting part 14b in the upper and lower direction is set to be wider than a width of the light guide member 13 in the upper and lower direction. Further, a width of the projecting part 14b in the right and left direction is set to be wider than a width of the card insertion port 3 in the right and left direction.

As described above, the card reader 1 in this embodiment is mounted on a game machine which is installed in a casino or a game arcade. The card reader 1 is used in a state that a card 2 is inserted into the card reader 1. Further, in a state that a card 2 is inserted into the card reader 1, the light sources 7 through 10 emit lights toward the light guide member 13 and thus a peripheral portion of the card insertion port 3 of the card insertion part 4 is illuminated.

(Principal Effects in this Embodiment)

As described above, in this embodiment, the light guide member 13 is formed so as to surround the entire periphery of the card insertion port 3 when viewed in the front and rear direction, and the front face 11b of the rigid circuit board 11 is formed as a reflection face configured to reflect light emitted toward a rear side from the light guide member 13 toward a front side. Further, in this embodiment, the cover member 14 covers the light sources 7 through 10, the rigid circuit board 11 and the light guide member 13 from the front side. Therefore, according to this embodiment, lights from the light sources 7 through 10 can be diffused over the entire peripheral portion of the card insertion port 3 on the rear side of the cover member 14 by operation of the light guide member 13 and the front face 11b. Further, in this embodiment, the cover member 14 is formed of translucent light transmissive material and thus light transmitting through the cover member 14 toward the front side can be made dull. As described above, in this embodiment, the light can be diffused over the entire peripheral portion of the card insertion port 3 on the rear side of the cover member 14 and the light diffused over the entire peripheral portion of the card insertion port 3 on the rear side of the cover member 14 can be made dull by the cover member 14. Therefore, according to this embodiment, the entire peripheral portion of the card insertion port 3 is capable of being illuminated uniformly, dully and beautifully.

Especially, in this embodiment, the light source 7 is disposed on an upper end side of the light guide member 13 so as to a emit light from a left end of the light guide member 13 to the right direction, and the light source 8 is disposed on a lower end side of the light guide member 13 so as to emit a light from a left end side of the light guide member 13 to the obliquely right upper direction. Further, the light source 9 is disposed on a lower end side of the light guide member 13 so as to emit a light from the right end of the light guide member 13 to the left direction, and the light source 10 is disposed on an upper end side of the light guide member 13 so as to emit a light from the right end side of the light guide member 13 to the obliquely left lower direction. Therefore, according to this embodiment, the light can be effectively diffused over the entire peripheral portion of the card insertion port 3 on the rear side of the cover member 14. Accordingly, in this embodiment, the entire peripheral portion of the card insertion port 3 can be illuminated further uniformly.

In this embodiment, the cover member 14 is formed of light transmissive material of a milk-white color and thus the entire peripheral portion of the card insertion port 3 can be further beautifully illuminated with various colors. Further, in this embodiment, the light sources 7 through 10 are disposed on outer sides in the right and left direction with respect to the projecting part 14b and, when viewed in the front and rear direction, the light sources 7 through 10 are disposed at positions where they do not overlap with an exposing portion of the card insertion part 4 in the front panel of a game machine. Therefore, according to this embodiment, the entire peripheral portion of the card insertion port 3 which is exposed in the front panel of a game machine on which the card reader 1 is mounted can be illuminated further uniformly, further dully and beautifully.

In this embodiment, the front face 11b of the rigid circuit board 11 is formed to be a reflection face configured to reflect light irradiated toward the rear side from the light guide member 13 toward the front side. Therefore, according to this embodiment, another reflection member for reflecting light irradiated toward a rear side from the light guide member 13 toward a front side is not required to provide separately in addition to the rigid circuit board 11 on which the light sources 7 through 10 are mounted. Accordingly, in this embodiment, a structure of the card insertion part 4 can be simplified.

In this embodiment, the light guide member 13 is formed in a flat plate shape and is disposed so as to contact with the front face 11b of the rigid circuit board 11, and the light sources 7 through 10 are disposed so as to emit lights toward the end faces of the light guide member 13. Therefore, according to this embodiment, the size of the card insertion part 4 can be reduced in the front and rear direction.

First Modified Embodiment of Card Insertion Part

Figure 3:
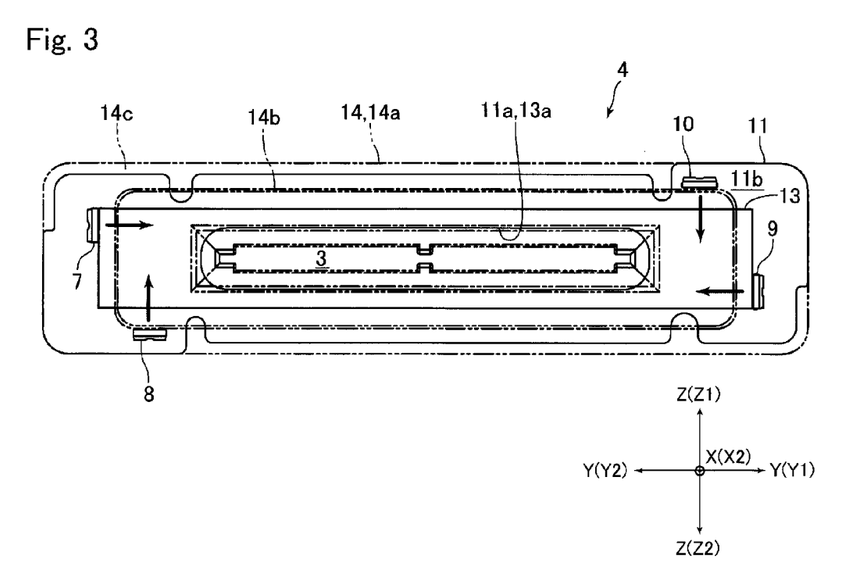
FIG. 3 is an explanatory front view showing a structure of a card insertion part in accordance with another embodiment of the present invention.
Figure 4:
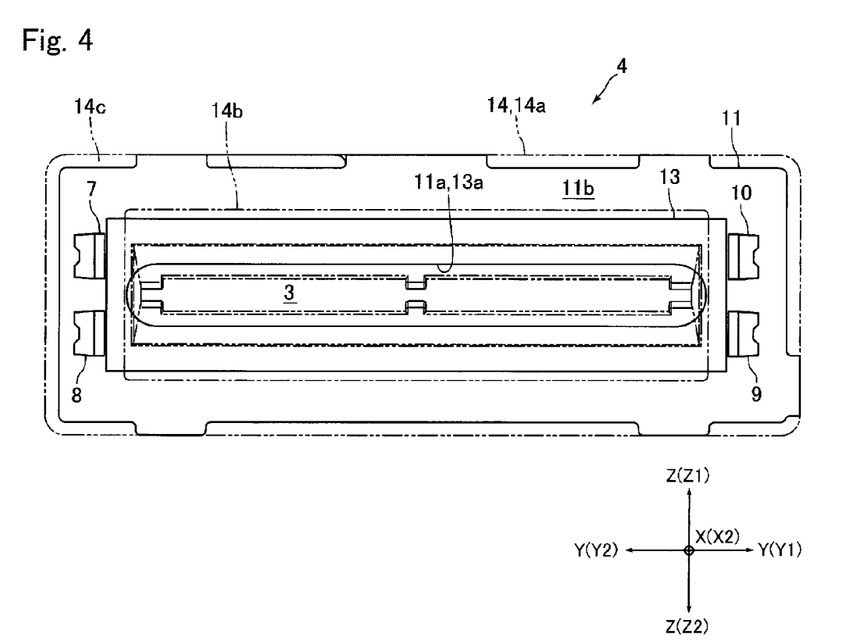
FIG. 4 is an explanatory front view showing a structure of a card insertion part in accordance with another embodiment of the present invention.

FIGS. 3 and 4 are explanatory front views showing a structure of a card insertion part 4 in accordance with another embodiment of the present invention.

In the embodiment described above, the light source 8 is disposed so that a light emission face of the light source 8 faces the chamfer part 13b formed at a corner part of a left lower end of the light guide member 13, and the light source 10 is disposed so that a light emission face of the light source 10 faces the chamfer part 13b formed at a corner part of a right upper end of the light guide member 13. However, the present invention is not limited to this embodiment. For example, as shown in FIG. 3, it may be structured that a light source 8 is disposed so that a light emission face of the light source 8 faces a lower end face of the light guide member 13 on a left end side of the light guide member 13, and that a light source 10 is disposed so that a light emission face of the light source 10 faces an upper end face of the light guide member 13 on a right end side of the light guide member 13. In other words, it may be structured that the light source 8 is disposed so as to emit a light to an upper direction from a lower end of the light guide member 13 to an upper end side of the light guide member 13 on a left end side of the light guide member 13, and that the light source 10 is disposed so as to emit a light to a lower direction from an upper end of the light guide member 13 to a lower end side of the light guide member 13 on a right end side of the light guide member 13. In the card insertion part 4 shown in FIG. 3, the light sources 8 and 10 are disposed on outer sides in the upper and lower direction with respect to the projecting part 14b. In other words, the light sources 8 and 10 are disposed at positions where they do not overlap with an exposing portion (in other words, the projecting part 14b) of the card insertion part 4 in the front panel of a game machine when viewed in the front and rear direction.

Also in the card insertion part 4 shown in FIG. 3, light can be effectively diffused over the entire peripheral portion of the card insertion port 3 on the rear side of the cover member 14 and, as a result, the entire peripheral portion of the card insertion port 3 can be illuminated further uniformly. Further, in the card insertion part 4 shown in FIG. 3, no chamfer part 13b may be formed in the light guide member 13. In a case that the light sources 8 and 10 are disposed so as to face the chamfer parts 13b of the light guide member 13 like the embodiment described above, in comparison with a case that the light sources 8 and 10 are disposed so as to face upper and lower end faces of the light guide member 13 as shown in FIG. 3, the size of the card insertion part 4 can be reduced in the upper and lower direction.

Further, as shown in FIG. 4, it may be structured that the light source 8 is disposed on a lower end side of the light guide member 13 and is disposed so as to emit a light to the right direction from a left end of the light guide member 13 toward the right end side of the light guide member 13, and that the light source 10 is disposed on an upper end side of the light guide member 13 and is disposed so as to emit a light to the left direction from a right end of the light guide member 13 toward the left end side of the light guide member 13. Also in the card insertion part 4 shown in FIG. 4, the light sources 7 through 10 are disposed at positions where they do not overlap with an exposing portion (in other words, the projecting part 14b) of the card insertion part 4 in the front panel of a game machine when viewed in the front and rear direction.

In the embodiment described above, the card insertion part 4 includes four light sources 7 through 10. However, the number of light sources included in the card insertion part 4 may be five or more. Alternatively, the number of light sources included in the card insertion part 4 may be not more than 3. For example, as shown in FIG. 4, in a case that a difference between a width in the right and left direction of the projecting part 14b which is an exposing portion of the card insertion part 4 in the front panel of a game machine and a width in the right and left direction of the card insertion port 3 is small, the card insertion part 4 may be provided with only the light source 7 and the light source 9, or may be provided with only the light source 8 and the light source 10.

In the embodiment described above and the modified embodiments shown in FIGS. 3 and 4, the front face 11b of the rigid circuit board 11 is formed to be a reflection face. However, the front face 11b may be formed with no reflection face. In this case, it may be structured that a reflection member configured to reflect light is disposed between the rigid circuit board 11 and the light guide member 13 in the front and rear direction. Further, in the embodiment described above and the modified embodiments shown in FIGS. 3 and 4, the light sources 7 through 10 are disposed at positions where they do not overlap with an exposing portion (in other words, the projecting part 14b) of the card insertion part 4 in the front panel of a game machine when viewed in the front and rear direction. However, at least one of the light sources 7 through 10 may be disposed at a position overlapping with the projecting part 14b when viewed in the front and rear direction. In addition, in the embodiment described above and the modified embodiments shown in FIGS. 3 and 4, the light sources 7 through 10 are disposed so as to emit lights toward end faces of the light guide member 13. However, it may be structured that a gap space is formed between the rigid circuit board 11 and the light guide member 13 in the front and rear direction, and that light sources 7 through 10 may be disposed so as to emit lights toward a rear side face of the light guide member 13.

Second Modified Embodiment of Card Insertion Part

Figure 5A:
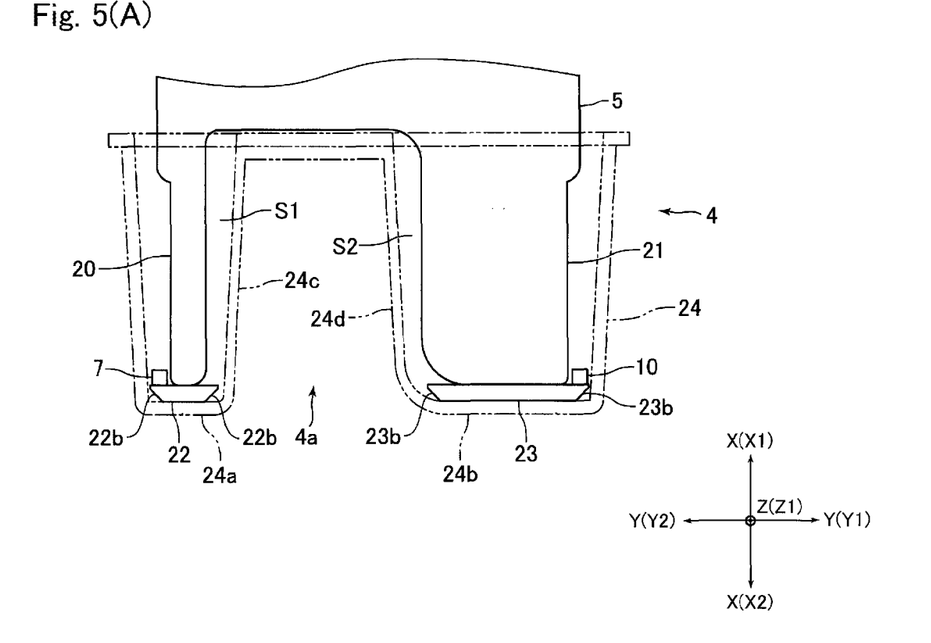
FIG. 5(A) is its plan view and FIG. 5(B) is its front view.
Figure 5B:
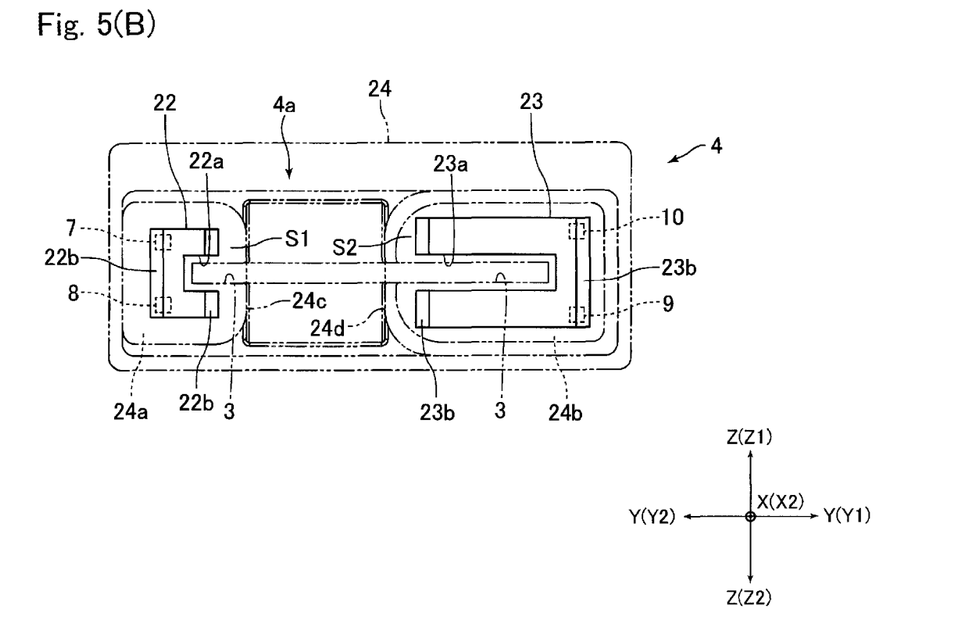
Figure 6:
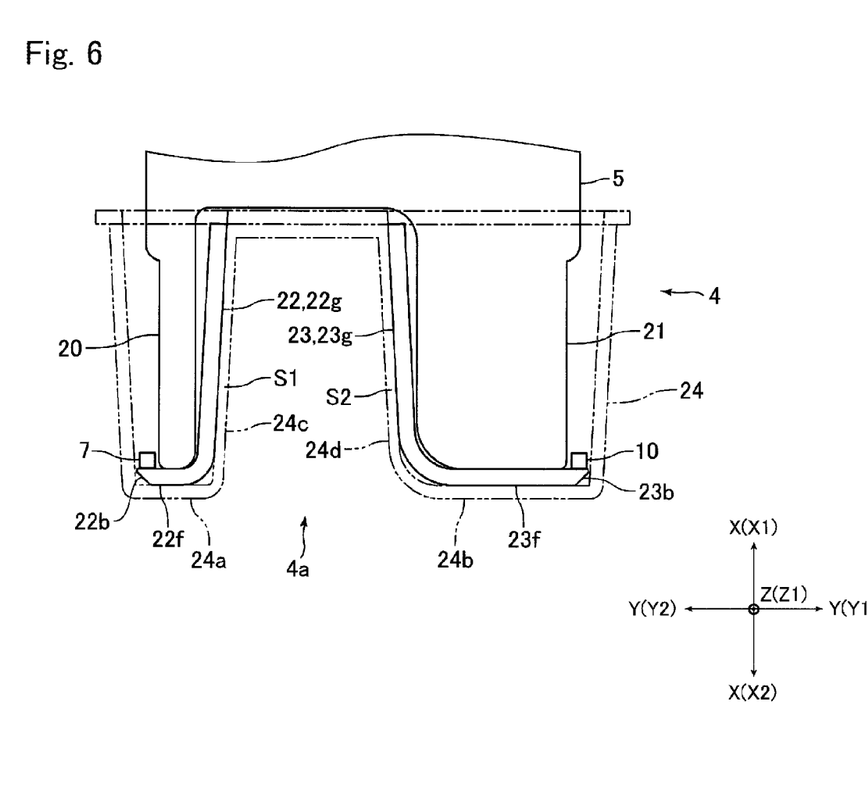
FIG. 6 is an explanatory plan view showing a structure of a card insertion part in accordance with another embodiment of the present invention.

FIGS. 5(A) and 5(B) are explanatory views showing a structure of a card insertion part 4 in accordance with another embodiment of the present invention. FIG. 5(A) is its plan view and FIG. 5(B) is its front view. FIG. 6 is an explanatory plan view showing a structure of a card insertion part 4 in accordance with another embodiment of the present invention.

In the embodiments described above, the card insertion part 4 is formed in a substantially rectangular stepped tube shape which is flat in a front and rear direction. However, the present invention is not limited to this embodiment. For example, as shown in FIGS. 5(A) and 5(B), a cut-out part 4a which is cut out from a front end of a card insertion part 4 toward a rear side may be formed at a middle position in the right and left direction of the card insertion part 4. In the card insertion part 4 shown in FIGS. 5(A) and 5(B), a card insertion port 3 is formed on both sides of the cut-out part 4a in the right and left direction. Further, the card insertion part 4 includes light sources 7 through 10, two guide parts 20 and 21 which are formed with a part of the card passage where a card 2 is passed, two light guide members 22 and 23 which are disposed on a front side of the guide parts 20 and 21, and a cover member 24 in which the card insertion port 3 is formed. In FIG. 5(B), the guide parts 20 and 21 are not shown.

The guide parts 20 and 21 are formed in a substantially rectangular block shape which is long and thin in the front and rear direction and are disposed on both sides of the cut-out part 4a in the right and left direction. Specifically, the guide member 20 is disposed on the left side of the cut-out part 4a and the guide member 21 is disposed on the right side of the cut-out part 4a. The guide parts 20 and 21 are formed with recessed parts which are recessed from inner side ends of the guide parts 20 and 21 in the right and left direction toward outer sides in the right and left direction and these recessed parts structure a part of the card passage.

The light guide members 22 and 23 are formed in a flat plate shape and are disposed so that thickness directions of the light guide members 22 and 23 and the front and rear direction are coincided with each other. The light guide member 22 is disposed on a front side of the guide part 20 and the light guide member 23 is disposed on a front side of the guide part 21. Specifically, the light guide member 22 is disposed so as to contact with a front end of the guide part 20, and the light guide member 23 is disposed so as to contact with a front end of the guide part 21. The light guide members 22 and 23 are formed with slits 22a and 23a where a card 2 is passed. The slits 22a and 23a are, as shown in FIG. 5(B), formed so as to be cut out from inner side ends in the right and left direction of the light guide members 22 and 23 toward outer sides in the right and left direction.

Light sources 7 and 8 are disposed on a left end side and a rear side of the light guide member 22 with a predetermined space therebetween in the upper and lower direction. Specifically, the light sources 7 and 8 are disposed so as to emit lights toward the light guide member 22 from a rear side of the light guide member 22. Light sources 9 and 10 are disposed on a right end side and a rear side of the light guide member 23 with a predetermined space therebetween in the upper and lower direction. Specifically, the light sources 9 and 10 are disposed so as to emit lights toward the light guide member 23 from a rear side of the light guide member 23. Further, when viewed in the front and rear direction, the light sources 7 through 10 are disposed on outer sides in the right and left direction with respect to the card insertion port 3.

Chamfer parts 22b and 23b are formed on front faces of both right and left ends of the light guide members 22 and 23. The chamfer part 22b formed at the left end of the light guide member 22 is stuck with a reflection member (not shown) formed in a thin plate shape or a film shape, and the chamfer part 23b formed at the right end of the light guide member 23 is stuck with a reflection member (not shown) formed in a thin plate shape or a film shape. For example, a silver seal is stuck as a reflection member on the chamfer parts 22b and 23b. The reflection members function to reflect lights emitted from the light sources 7 through 10 from a rear side of the light guide members 22 and 23 to diffuse in the entire light guide members 22 and 23.

Further, portions of rear side faces of the light guide members 22 and 23 at least other than emitted parts to which lights from the light sources 7 through 10 are emitted are stuck with a reflection member (not shown) formed in a thin plate shape or a film shape. For example, a white seal is stuck as a reflection member on rear side faces of the light guide members 22 and 23. The reflection members function to reflect lights irradiated toward rear sides from the light guide members 22 and 23 toward front sides. In the card insertion part 4 shown in FIGS. 5(A) and 5(B), no reflection member is stuck on a right end side portion of the rear side face of the light guide member 22 and a left end side portion of the rear side face of the light guide member 23. However, a reflection member may be stuck on a right end side portion of the rear side face of the light guide member 22 and a left end side portion of the rear side face of the light guide member 23.

The cover member 24 is, similarly to the cover member 14, formed of translucent light transmissive material. Specifically, the cover member 24 is formed of light transmissive material of a milk-white color. Further, the cover member 24 is formed so as to cover the guide part 20 and the light guide member 22 from a front side, both upper and lower sides and both right and left sides and, in addition, so as to cover the guide part 21 and the light guide member 23 from a front side, both upper and lower sides and both right and left sides. In other words, the cover member 24 is provided with a front face part 24a which covers the guide part 20 and the light guide member 22 from the front side, and a front face part 24b which covers the guide part 21 and the light guide member 23 from the front side. Further, the cover member 24 is provided with a cover part 24c which covers the guide part 20 and the light guide member 22 from a right side, and a cover part 24d which covers the guide part 21 and the light guide member 23 from a left side. In other words, the cover member 24 is provided with the cover parts 24c and 24d which are disposed on both sides of the cut-out part 4a and cover the guide parts 20 and 21 from inner sides in the right and left direction.

The front face parts 24a and 24b and the cover parts 24c and 24d are formed with a slit where a card 2 is passed. The slits formed in the front face parts 24a and 24b are formed as the card insertion port 3. As described above, the light guide members 22 and 23 are formed with the slits 22a and 23a where a card 2 is passed and, as shown in FIG. 5(B), the light guide members 22 and 23 are formed so as to surround parts of a periphery of the card insertion port 3 when viewed in the front and rear direction. Further, in the right and left direction, a space "S1" is formed between the guide part 20 and the cover part 24c, and a space "S2" is formed between the guide part 21 and the cover part 24d.

In the card insertion part 4 shown in FIGS. 5(A) and 5(B), the light guide members 22 and 23 are formed so as to surround parts of a periphery of the card insertion port 3 when viewed in the front and rear direction. Further, in the card insertion part 4, a reflection member is stuck on portions of the rear side faces of the light guide members 22 and 23 at least except emitted parts to which lights are emitted from the light sources 7 through 10. Further, in the card insertion part 4, the front face parts 24a and 24b of the cover member 24 cover the light guide members 22 and 23 from a front side. Therefore, in the card insertion part 4, lights from the light sources 7 through 10 can be diffused over the entire peripheral portion of the card insertion port 3 on the rear sides of the front face parts 24a and 24b. Further, the cover member 24 is formed of translucent light transmissive material and thus lights transmitted through the front face parts 24a and 24b toward a front side can be made dull. Therefore, in the card insertion part 4 shown in FIGS. 5(A) and 5(B), even when the cut-out part 4a is formed in the card insertion part 4, the entire peripheral portion of the card insertion port 3 can be illuminated uniformly, dully and beautifully.

Further, in the card insertion part 4 shown in FIGS. 5(A) and 5(B), a space "S1" is formed between the guide part 20 and the cover part 24c, and a space "S2" is formed between the guide part 21 and the cover part 24d. Further, in the card insertion part 4 shown in FIGS. 5(A) and 5(B), no reflection member is stuck on a right end side portion of the rear side face of the light guide member 22 and a left end side portion of the rear side face of the light guide member 23. Therefore, in the card insertion part 4, both sides in the right and left direction of the cut-out part 4a can be illuminated dully by utilizing the spaces "S1" and "S2". Further, in the card insertion part 4, the light sources 7 through 10 are disposed so as to emit lights toward the light guide members 22 and 23 from rear sides of the light guide members 22 and 23 and thus the size of the card insertion part 4 can be reduced in the right and left direction.

In addition, in the card insertion part 4, the reflection members stuck on the rear side faces of the light guide members 22 and 23 are formed in a thin plate shape or a film shape. Therefore, even when the reflection members configured to reflect lights irradiated toward rear sides from the light guide members 22 and 23 toward a front side are provided, the size of the card insertion part 4 can be reduced in the front and rear direction. In the card insertion part 4 shown in FIGS. 5(A) and 5(B), it may be structured that no space "S1" is formed between the guide part 20 and the cover part 24c and no space "S2" is formed between the guide part 21 and the cover part 24d.

In the card insertion part 4 shown in FIGS. 5(A) and 5(B), the light guide members 22 and 23 are formed in a flat plate shape. However, as shown in FIG. 6, the light guide members 22 and 23 may be structured of first light guide parts 22f and 23f in a flat plate shape which are disposed on front sides of the guide parts 22 and 23, and second light guide parts 22g and 23g in a flat plate shape which are connected with inner side ends of the first light guide parts 22f and 23f in the right and left direction and are disposed in the spaces "S1" and "S2". In other words, the light guide members 22 and 23 may be formed in a substantially "L"-shape when viewed in the upper and lower direction. In this case, lights can be diffused in the whole of the spaces "S1" and "S2" by operation of the second light guide parts 22g and 23g and thus the whole of both sides in the right and left direction of the cut-out part 4a can be illuminated dully and beautifully.

Further, in this case, as shown in FIG. 6, it is preferable that the first light guide parts 22f and 23f and the second light guide parts 22g and 23g are connected with each other through smooth gradually curved faces. Alternatively, the first light guide parts 22f and 23f and the second light guide parts 22g and 23g may be separately formed from each other. However, it is preferable that, as shown in FIG. 6, the first light guide parts 22f and 23f and the second light guide parts 22g and 23g are integrally formed with each other without gaps. In other words, it is preferable that the first light guide part 22f and the second light guide part 22g are formed as one component and that the first light guide part 23f and the second light guide part 23g are formed as one component.

In the card insertion part 4 shown in FIGS. 5(A) and 5(B) or FIG. 6, the card insertion part 4 may be provided with only one of the light source 7 and the light source 8. Further, in the card insertion part 4 shown in FIGS. 5(A) and 5(B) or FIG. 6, the card insertion part 4 may be provided with only one of the light source 9 and the light source 10.

OTHER EMBODIMENTS

Although the present invention has been shown and described with reference to a specific embodiment, various changes and modifications will be apparent to those skilled in the art from the teachings herein.

In the embodiment described above and the first modified embodiment, a light diffusion member may be disposed between the light guide member 13 and the cover member 14 in the front and rear direction. Further, in the second modified embodiment, a light diffusion member may be disposed between the light guide members 22 and 23 and the front face parts 24a and 24b of the cover member 24 in the front and rear direction. In these cases, light can be diffused effectively in the entire peripheral portion of the card insertion port 3 and thus the entire peripheral portion of the card insertion port 3 can be illuminated further uniformly.

In the embodiments described above, the light sources 7 through 10 are LEDs. However, the light sources 7 through 10 may be light sources other than an LED. Further, in the embodiments described above, the card reader 1 is a manual type card reader. However, a card reader to which at least an embodiment of the present invention is applied may be a card conveyance type card reader which is structured to automatically convey a card 2. In addition, in the embodiments described above, the card reader 1 is mounted on a game machine. However, the card reader 1 may be mounted on a host apparatus other than a game machine. For example, the card reader 1 provided with the card insertion part 4 in accordance with the second modified embodiment may be mounted and used in a host apparatus such as an ATM (Automated Teller Machine).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card insertion part for use with a card, the card insertion part comprising:
    a card insertion port;
    a light guide member which surrounds at least a part of a periphery of the card insertion port when viewed in an inserting direction of the card;
    a light source configured to emit a light toward the light guide member;
    a reflection member disposed on a rear side with respect to the light guide member in the inserting direction of the card; and
    a cover member comprising the card insertion port and covers at least the light guide member and the light source from a front side in the inserting direction of the card;
    wherein the cover member comprises translucent light transmissive material.

2. The card insertion part according to claim 1, wherein the cover member comprises light transmissive material having a milk-white color.

3. The card insertion part according to claim 2, wherein the reflection member is a rigid circuit board on which the light source is mounted.

4. The card insertion part according to claim 3, wherein the light guide member is formed in a flat plate shape and is disposed so as to contact with a surface of the rigid circuit board, and
    the light source is disposed so as to emit a light toward an end face of the light guide member.

5. The card insertion part according to claim 2, further comprising a cut-out part formed so as to cut out from a front end of the card insertion part in an inserting direction of the card toward a rear side in the card inserting direction at an intermediate position of the card insertion part in a width direction of the card perpendicular to an inserting direction of the card and a thickness direction of the card,
    wherein a guide part formed with a part of a card passage where the card is passed and the light guide member disposed at least on a front side in the inserting direction of the card with respect to the guide part are disposed on both sides of the cut-out part in the width direction of the card, and the cover member covers the guide part and the light guide member.

6. The card insertion part according to claim 5, wherein the light source is disposed so that a light is emitted toward the light guide member from a rear side of the light guide member in an inserting direction of the card, and the reflection member is formed in a plate shape or a film shape and is stuck on a portion of a rear side face of the light guide member in the inserting direction of the card except at least an emitted part where the light from the light source is emitted.

7. The card insertion part according to claim 1, wherein the reflection member is a rigid circuit board on which the light source is mounted.

8. The card insertion part according to claim 7, wherein the light guide member is formed in a flat plate shape and is disposed so as to contact a surface of the rigid circuit board, and the light source is disposed so as to emit a light toward an end face of the light guide member.

9. The card insertion part according to claim 7, wherein the light source comprises a first light source and a second light source, the light guide member is formed in a flat plate shape so as to surround an entire periphery of the card insertion port when viewed in the inserting direction of the card, the first light source is disposed so as to emit a light to one side in a width direction of the card perpendicular to the inserting direction of the card and a thickness direction of the card from one end of the light guide member in the width direction of the card toward the other end side of the light guide member, and the second light source is disposed so as to emit a light to the other side in the width direction of the card from the other end of the light guide member in the width direction of the card toward one end side of the light guide member.

10. The card insertion part according to claim 9, wherein the light source further comprises a third light source and a fourth light source, the light guide member is formed in a substantially rectangular frame shape, on one side of the light guide member in the width direction of the card, the first light source is disposed on one side in the thickness direction of the card, and the third light source is disposed on the other side in the thickness direction of the card and is disposed so that a light is emitted in an inclined direction with respect to the width direction of the card and the thickness direction of the card so as to go substantially toward the card insertion port when viewed in the inserting direction of the card, and on the other side of the light guide member in the width direction of the card, the second light source is disposed on the other side in the thickness direction of the card, and the fourth light source is disposed on the one side in the thickness direction of the card and is disposed so that a light is emitted in an inclined direction with respect to the width direction of the card and the thickness direction of the card so as to go substantially toward the card insertion port when viewed in the inserting direction of the card.

11. The card insertion part according to claim 9, wherein the light source further comprises a third light source and a fourth light source, the light guide member is formed in a substantially rectangular frame shape, on one side of the light guide member in the width direction of the card, the first light source is disposed on one side in the thickness direction of the card, and the third light source is disposed on the other side in the thickness direction of the card and is disposed so that a light is emitted to the one side in the thickness direction of the card toward a side of one end of the light guide member in the thickness direction of the card from the other end of the light guide member, on the other side of the light guide member in the width direction of the card, the second light source is disposed on the other side in the thickness direction of the card, and the fourth light source is disposed on the one side in the thickness direction of the card and is disposed so that a light is emitted to the other side in the thickness direction of the card from the one end of the light guide member toward a side of the other end of the light guide member in the thickness direction of the card.

12. The card insertion part according to claim 1, wherein the light source comprises a first light source and a second light source, the light guide member is formed in a flat plate shape so as to surround an entire periphery of the card insertion port when viewed in the inserting direction of the card, the first light source is disposed so as to emit a light to one side in a width direction of the card perpendicular to the inserting direction of the card and a thickness direction of the card from one end of the light guide member in the width direction of the card toward the other end side of the light guide member, and the second light source is disposed so as to emit a light to the other side in the width direction of the card from the other end of the light guide member in the width direction of the card toward one end side of the light guide member.

13. The card insertion part according to claim 12, wherein the light source further comprises a third light source and a fourth light source, the light guide member is formed in a substantially rectangular frame shape, on one side of the light guide member in the width direction of the card, the first light source is disposed on one side in the thickness direction of the card, and the third light source is disposed on the other side in the thickness direction of the card and is disposed so that a light is emitted in an inclined direction with respect to the width direction of the card and the thickness direction of the card so as to go substantially toward the card insertion port when viewed in the inserting direction of the card, and on the other side of the light guide member in the width direction of the card, the second light source is disposed on the other side in the thickness direction of the card, and the fourth light source is disposed on the one side in the thickness direction of the card and is disposed so that a light is emitted in an inclined direction with respect to the width direction of the card and the thickness direction of the card so as to go substantially toward the card insertion port when viewed in the inserting direction of the card.

14. The card insertion part according to claim 12, wherein the light source further comprises a third light source and a fourth light source,
the light guide member is formed in a substantially rectangular frame shape,
on one side of the light guide member in the width direction of the card,
the first light source is disposed on one side in the thickness direction of the card, and
the third light source is disposed on the other side in the thickness direction of the card and is disposed so that a light is emitted to the one side in the thickness direction of the card toward a side of one end of the light guide member in the thickness direction of the card from the other end of the light guide member,
on the other side of the light guide member in the width direction of the card,
the second light source is disposed on the other side in the thickness direction of the card, and
the fourth light source is disposed on the one side in the thickness direction of the card and is disposed so that a light is emitted to the other side in the thickness direction of the card from the one end of the light guide member toward a side of the other end of the light guide member in the thickness direction of the card.

15. The card insertion part according to claim 1, further comprising a cut-out part cut out from a front end of the card insertion part in an inserting direction of the card toward a rear side in the card inserting direction at an intermediate position of the card insertion part in a width direction of the card perpendicular to an inserting direction of the card and a thickness direction of the card,
wherein a guide part formed with a part of a card passage where the card is passed and the light guide member disposed at least on a front side in the inserting direction of the card with respect to the guide part are disposed on both sides of the cut-out part in the width direction of the card, and
the cover member covers the guide part and the light guide member.

16. The card insertion part according to claim 15, wherein the light source is disposed so that a light is emitted toward the light guide member from a rear side of the light guide member in an inserting direction of the card, and
the reflection member is formed in a plate shape or a film shape and is stuck on a portion of a rear side face of the light guide member in the inserting direction of the card except at least an emitted part where the light from the light source is emitted.

17. The card insertion part according to claim 15, wherein the cover member comprises cover parts disposed on both sides of the cut-out part in the width direction of the card and covering the guide parts from inner sides in the width direction of the card, and
a space is formed between the cover part and the guide part in the width direction of the card.

18. The card insertion part according to claim 17, wherein the light guide member is provided with a first light guide part disposed on a front side of the guide part in the inserting direction of the card, and a second light guide part connected with an inner side end of the first light guide part in the width direction of the card and is disposed in the space between the cover part and the guide part.

19. The card insertion part according to claim 1, further comprising a light diffusion member disposed between the light guide member and the cover member in the inserting direction of the card.

20. A card reader for use with a card, the card reader comprising:
a card insertion part comprising a card insertion port into which the card is inserted; and
a main body part to which the card insertion part is fixed
wherein the card insertion part further comprises:
a light guide member surrounding at least a part of a periphery of the card insertion port when viewed in an inserting direction of the card;
a light source configured to emit a light toward the light guide member;
a reflection member disposed on a rear side with respect to the light guide member in the inserting direction of the card; and
a cover member formed with the card insertion port and covering at least the light guide member and the light source from a front side in the inserting direction of the card;
wherein the cover member comprises translucent light transmissive material.

21. The card reader according to claim 20, wherein the cover member comprises light transmissive material having a milk-white color.

22. The card reader according to claim 20, wherein the reflection member is a rigid circuit board on which the light source is mounted.

23. The card reader according to claim 20, wherein
the light source comprises a first light source and a second light source,
the light guide member is formed in a flat plate shape so as to surround an entire periphery of the card insertion port when viewed in the inserting direction of the card,
the first light source is disposed so as to emit a light to one side in a width direction of the card perpendicular to the inserting direction of the card and a thickness direction of the card from one end of the light guide member in the width direction of the card toward the other end side of the light guide member, and
the second light source is disposed so as to emit a light to the other side in the width direction of the card from the other end of the light guide member in the width direction of the card toward one end side of the light guide member.

24. The card reader according to claim 20, further comprising a cut-out part formed so as to cut out from a front end of the card insertion part in an inserting direction of the card toward a rear side in the card inserting direction at an intermediate position of the card insertion part in a width direction of the card perpendicular to an inserting direction of the card and a thickness direction of the card,
wherein a guide part formed with a part of a card passage where the card is passed and the light guide member disposed at least on a front side in the inserting direction of the card with respect to the guide part are disposed on both sides of the cut-out part in the width direction of the card, and
the cover member covers the guide part and the light guide member.

25. The card reader according to claim 20, further comprising a light diffusion member disposed between the light guide member and the cover member in the inserting direction of the card.

* * * * *